US009356926B1

(12) United States Patent
Thomas et al.

(10) Patent No.: US 9,356,926 B1
(45) Date of Patent: *May 31, 2016

(54) SECURITY SYSTEM

(71) Applicant: Progressive Casualty Insurance Company, Mayfield Village, OH (US)

(72) Inventors: Michael F. Thomas, Cortland, OH (US); Martin R. Polak, Bay Village, OH (US); Dennis C. Kunc, Mentor, OH (US); Frank N. Stanich, Jr., Willowick, OH (US); Raymond S. Ling, Westlake, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/183,126

(22) Filed: Feb. 18, 2014

Related U.S. Application Data

(63) Continuation of application No. 11/117,877, filed on Apr. 29, 2005, now Pat. No. 8,694,788.

(51) Int. Cl.
*H04L 29/06* (2006.01)

(52) U.S. Cl.
CPC .................................. *H04L 63/0823* (2013.01)

(58) Field of Classification Search
CPC ...................................................... G06F 21/64
USPC ................................................. 713/165–167
See application file for complete search history.

(56) References Cited

U.S. PATENT DOCUMENTS

| 4,903,201 | A | 2/1990 | Wagner |
| 6,883,135 | B1 | 4/2005 | Obata et al. |
| 7,340,608 | B2 | 3/2008 | Laurie et al. |
| 7,693,866 | B1 * | 4/2010 | Weaver ............ G06F 17/30011 |
| | | | 707/999.107 |
| 7,698,230 | B1 | 4/2010 | Brown et al. |
| 8,301,553 | B1 | 10/2012 | Trimble et al. |

(Continued)

OTHER PUBLICATIONS

Mjolnes et al., "Localized credentials for server assisted mobile wallet," Computer Networks and Mobile Computing, 2001. Proceedings. 2001 International Conference on Year: 2001 pp. 203-208.*

(Continued)

*Primary Examiner* — Roderick Tolentino
(74) *Attorney, Agent, or Firm* — Brinks Gilson & Lione

(57) ABSTRACT

A security system includes an interface, a main computer, and an application server. The interface enables a user to access a remote document related to a product. The main computer stores documents related to the product and generates a pair of localized encryption keys. The encryption keys include a first key that encrypts data and second key that decrypts the data. An application server that is remote from the interface transmits and receives the document from the interface. The main computer authenticates the integrity of the document in a local operation by signing the document with the first key before it is transmitted to the interface and by signing the document with the second key after it is received from the interface. A method of authenticating the integrity of information related to a selected product stored on a main computer includes generating the localized pair of encryption keys; signing the document with the first key at the main computer; transmitting the signed document to an interface or a Web browser; and signing the document with the second key at the main computer when the document is received from the interface or the Web browser.

21 Claims, 7 Drawing Sheets

(56) References Cited

U.S. PATENT DOCUMENTS

| | | | |
|---|---|---|---|
| 2001/0034845 A1* | 10/2001 | Brunt | G06F 21/31 726/28 |
| 2002/0053021 A1 | 5/2002 | Rice et al. | |
| 2002/0078355 A1* | 6/2002 | Samar | G06F 21/6218 713/176 |
| 2002/0154162 A1* | 10/2002 | Bhatia | G06Q 30/06 715/745 |
| 2003/0023850 A1 | 1/2003 | Brown et al. | |
| 2003/0060214 A1 | 3/2003 | Hendrey et al. | |
| 2003/0093678 A1* | 5/2003 | Bowe | H04L 9/3236 713/180 |
| 2003/0126436 A1* | 7/2003 | Greenberg | H04L 9/3271 713/168 |
| 2003/0163700 A1 | 8/2003 | Paatero | |
| 2003/0212893 A1 | 11/2003 | Hind et al. | |
| 2003/0217264 A1* | 11/2003 | Martin | G06F 21/6209 713/156 |
| 2004/0093493 A1* | 5/2004 | Bisbee | G06Q 20/00 713/156 |
| 2005/0138065 A1* | 6/2005 | Ciriza | G06Q 10/10 |
| 2005/0177389 A1* | 8/2005 | Rakowicz | G06Q 20/3829 705/75 |

OTHER PUBLICATIONS

Shi et al., "Signature-based approach to fair document exchange," IEE Proceedings—Communications Year: 2003, vol. 150, Issue: 1 pp. 21-27.*

The Marketing of Insurance over the Internet, National Association of Insurance Commissioners, copyright 1998, Stamped with law firm library date of Apr. 29, 1998; 65 pages.

* cited by examiner

SECURITY SYSTEM

PRIORITY CLAIM

This application is a continuation of U.S. patent application Ser. No. 11/117,877, filed Apr. 29, 2005. The disclosure of U.S. patent application Ser. No. 11/117,877 is incorporated herein by reference.

BACKGROUND OF THE INVENTION

1. Technical Field

The inventions relate to security systems, and more particularly, to electronic systems that verify and authenticate a party to a transaction and associate one or more electronic documents to an individual.

2. Related Art

Web based interfaces are accessible through publicly distributed networks like the Internet. Users send and receive documents that may include various formats including text, graphics, and images. Some documents include sensitive information that requires the tracking of a sender's identity within the network connection to ensure that the information is not modified or repudiated. These documents may be protected by a chain of security, where each link warrants the content of that information.

Some systems use unique electronic codes that verify that a message was received from a true sender. These systems may use an asymmetric scheme of codes for encryption. A secret code may be used to encrypt a signature while a public code may be used to decrypt it. The two codes are often different, and one may not be derived from the other.

While public codes are openly shared, secret codes are often guarded by the person generating the signature within their computers. These computers can be the weakest link in a secure system. Some computers may be subject to viral attacks that infect the computer by copying and sending files while appearing to do something useful. Video cameras or surveillance software may acquire a secret code without a user's knowledge or consent. Some computers that are resistant to internal attacks may be induced to sign a document by an infected computer.

There is a need for a system that allows users to digitally sign a document without retaining a code in a user's computer or require a user to obtain a code prior to signing the document. There is also a need for a system that allows users to view and sign many types of documents.

SUMMARY

A security system includes an interface, a main computer, and an application interface. The interface enables a user to access a remote document related to a product. The main computer stores documents related to the product and generates a pair of localized encryption keys. The encryption keys include a first key that encrypts data and a second key that decrypts the data. An application server remote from the interface transmits the document to the interface. The main computer authenticates the integrity of the document by signing the document with the first key before it is transmitted to the interface and by signing the document with the second key when the document is received from the interface.

A method of authenticating the integrity of information related to a selected product stored on a main computer includes generating a localized pair of encryption keys that includes a first key that encrypts the document data and a second key that decrypts the document data; signing the document with the first key at the main computer; transmitting the signed document to an interface or Web browser; and signing the document with the second key at the main computer when the document is received from the interface or Web browser.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE PREFERRED EMBODIMENTS

An electronic security system is capable of authenticating a request through encryption and authorizations that are used to sign electronic documents. The system may authenticate a user or the integrity of a document without continuously monitoring the details of an exchange. The system may also maintain the integrity of its validations without passing encryption keys or digital certificates across a publicly accessible distributed network.

Figure 1:
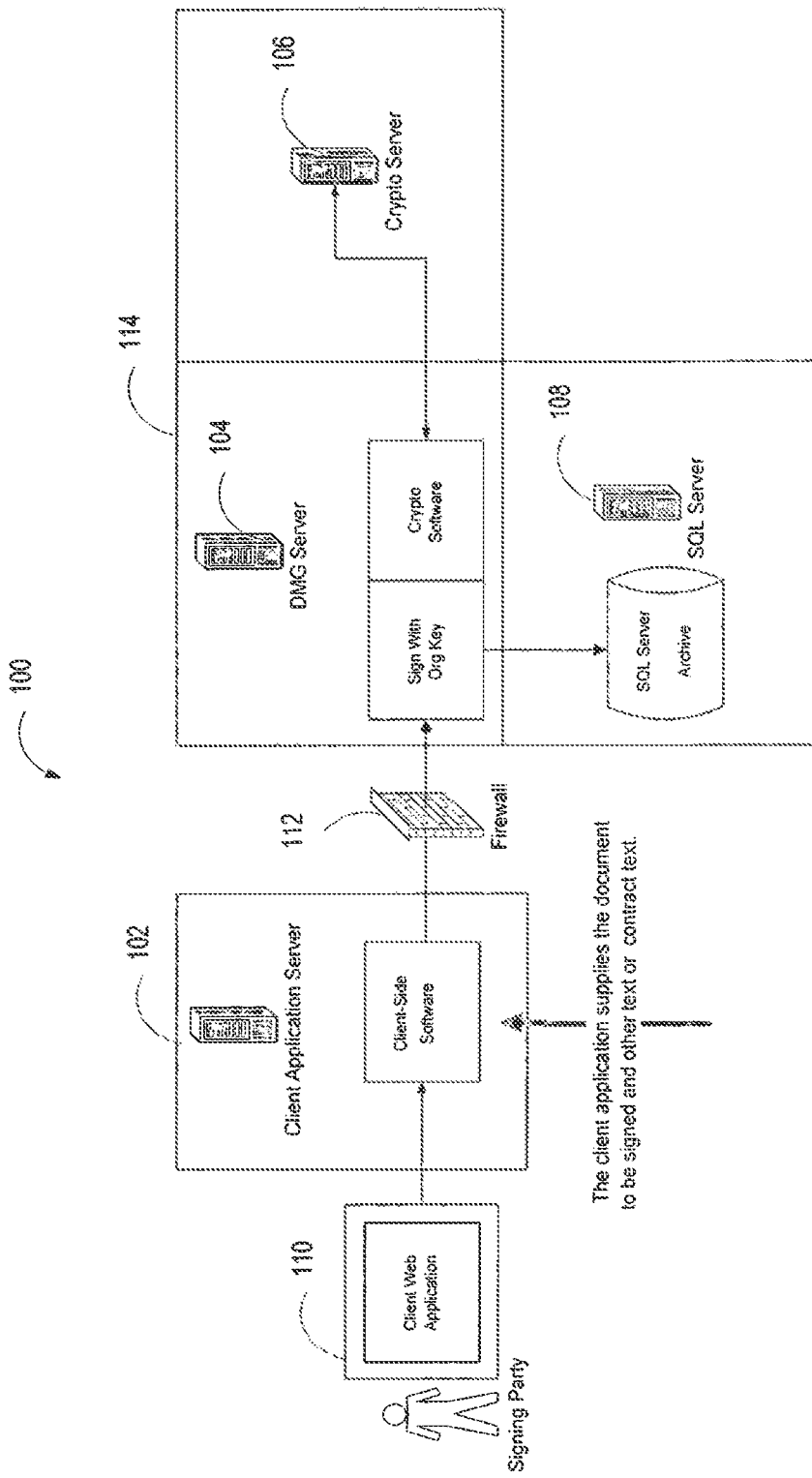
FIG. 1 is a partial block diagram of a security system coupled to a client application processing a document.

FIG. 1 is a partial block diagram of a security system 100 processing a user supplied document. The security system 100 includes a document management group server 104, a cryptography server 106, and a relational database resident to a structured query language server (SQL server) 108. A client application interfaces a client application server 102. The client application may include software or a Web application that is capable of uploading, downloading, and transferring files, displaying graphics embedded in a document, playing audio or video files associated with a document, and/or executing programs included with a document. The client application may be stored in remote memory resident to a remote computer 110. The term document refers to the entity exchanged between a user such as a signing party and the client application server 102. It is not limited to textual information or a collection of text and images. Many different types of content may be exchanged. A document may be the response generated from a particular resource that is considered static or dynamic. A dynamic resource is generated on the fly when a request is made. Static responses are pregenerated independent of a user's request.

In FIG. 1, a user or agent supplies a document. The document may be received in any commonly recognized format. An extensible markup language object or document (XML) may be used. The document may be accompanied by an agreement that may be a fragment of the user supplied document or a separate document. The agreement may be logically the same type of document for any process that may manipulate it, but may also be physically different. The agreement may notify one or more parties that their electronic signatures to a document are binding.

When the documents are received, the client application server 102 requests an electronic signature page from the document management group server 104. The request may pass through a firewall 112 that can selectively prevent computers in the organization's network from communicating with computers external to the network. The firewall 112 may bridge a publicly accessible distributed network such as the Internet to a privately accessible network such as a local area network (LAN), a wide area network (WAN), a baseband network, a broadband network, a token ring network or another network or combination of networks that link a main computer or server cluster 114. In some systems, all communication is routed through a proxy server that may reside outside of the server cluster 114. The proxy server may filter and discard requests that the owner does not find appropriate, such as requests for unauthorized access to proprietary files. In some alternative systems (not shown), the server cluster 114 or main computer may also include the firewall and/or the client application server 102.

Using an encryption algorithm, such as a Rivest-Shamir-Adleman (RSA) encryption, an Advanced Encryption Standard (AES), a Data Encryption Standard (DES), triple DES, a Pretty Good Privacy (PGP) or another method, the cryptography server 106 generates an organizational key that signs the documents and produces hash values, such as secure hash values (e.g., SHA1) for those documents. The hash values may be used to verify the integrity of the documents while the documents and hash values are temporarily staged in the SQL server 108. An audit record may also be created and temporarily archived in the SQL server 108. The audit record may correspond to a method or function that runs as part of the transaction and may include one or more of a journal key that uniquely identifies the transaction, a client indicator that identifies the client application, time stamps that identify when a method began and ended, the names of the components and classes that ran the method, an error code, error source, an error description, and if an error is suspected or detected, a trace parameter.

Figure 2:
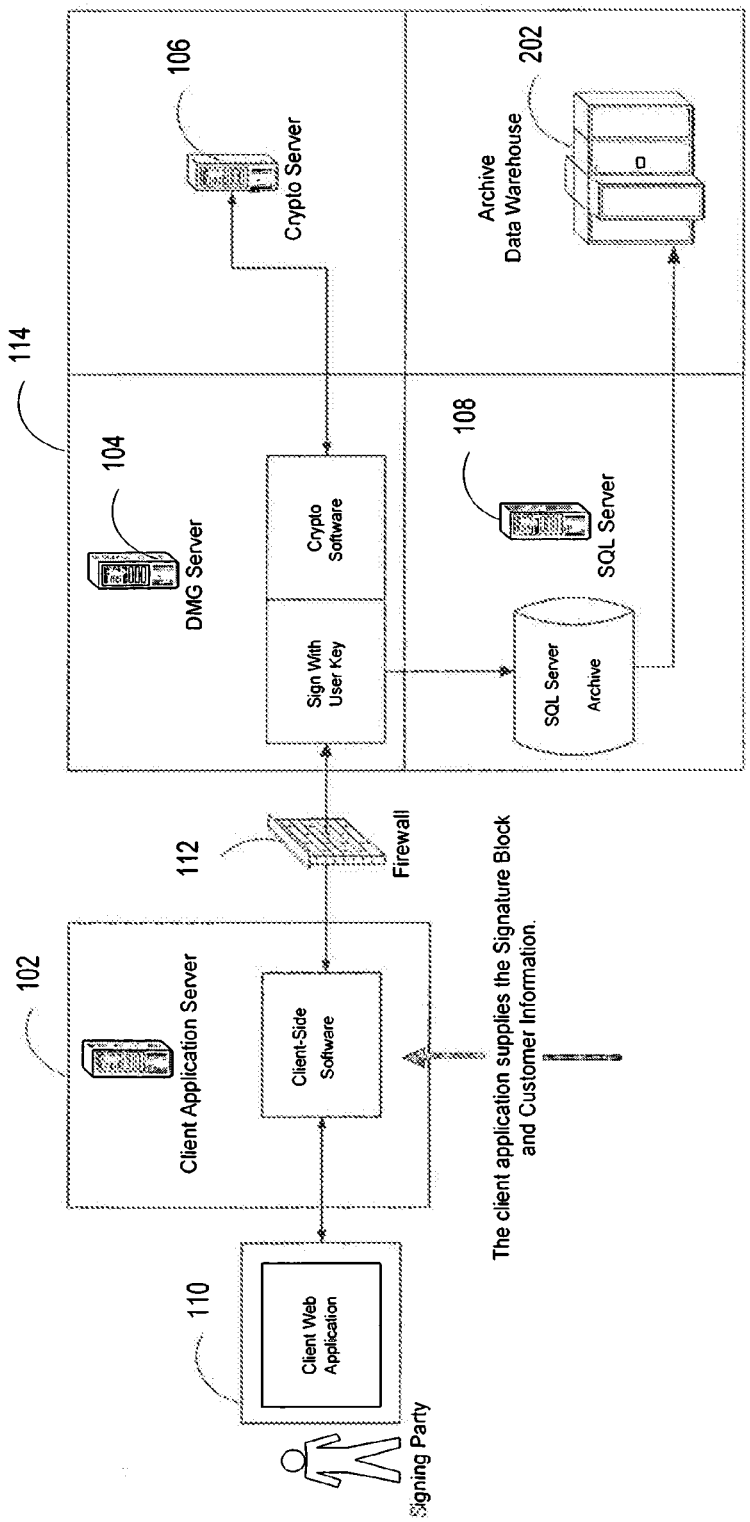
FIG. 2 is a partial block diagram of the security system coupled to the client application authenticating the integrity of one or more documents of FIG. 1 or FIG. 3.

Once the documents and files are temporarily staged in the SQL server 108, the user or agent supplied documents are streamed back through the firewall 112 and delivered to the client application, or more specifically, to the Web browser through a portal in the client application where they are signed by a user as shown in FIG. 2. Any distinctive mark, characteristic, signal, or sound that uniquely identifies a user or their agent may be used by the user or their agent to sign the documents. When a signature is submitted, client side software compares validation data to signature block data in real or batch time. If the user or their agent's signature is validated, the user and agreement documents that were previously signed with the organizational key are signed with a user key and a digital certificate is dynamically generated by the cryptography server 106. The digital certificate may be an electronic credential that authenticates the user or agent and may be compliant with the X.509 or another standard.

In FIG. 2, the signature block may also be signed by the user key and mapped to a numerical value by a hash algorithm such as a secure hash algorithm. The user keyed documents and the signature block hash value are then temporarily staged in the SQL server 108. In some transactions, customer information that includes a customer's name and address and a second audit record may be stored in the SQL server 108.

SQL documents may be swept to an archive 202, data warehouse, or a middleware component that coherently shares and manages data and meta data in a grid or distributed computing environment (e.g., Mobius located in Rye N.Y.). The SQL documents may be stored on a synchronous or asynchronous (e.g., batch) program or schedule. In some instances, the documents may not be transferred until an event occurs. In some transactions, the event may be the completion of a fund transfer or a credit approval. In an insurance transaction, the event may be the association of an insurance policy to the transaction. If an insurance policy number has not issued, the documents may be temporarily retained until the insurance policy issues.

Figure 3:
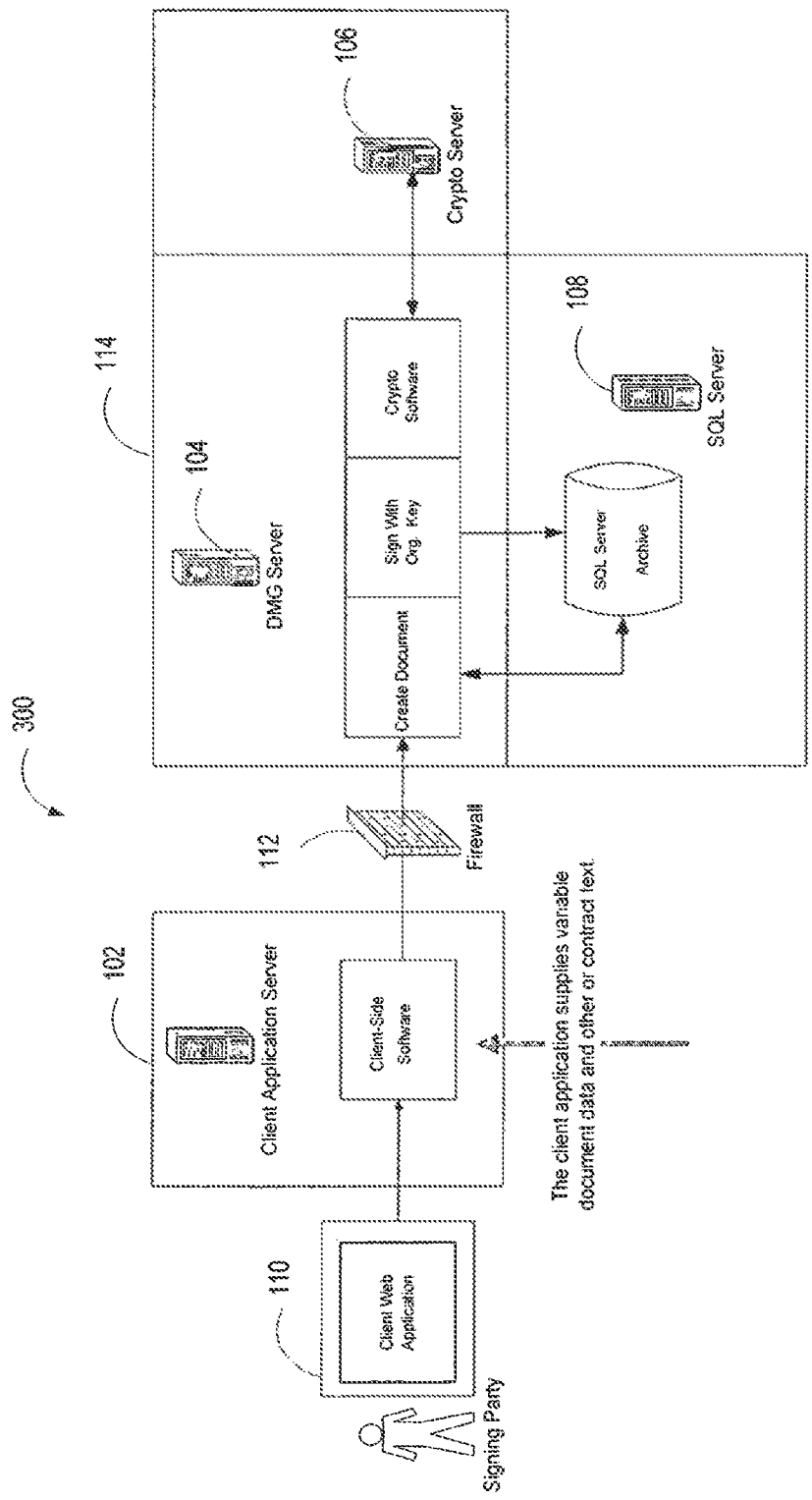
FIG. 3 is an alternative partial block diagram of the security system coupled to a client application processing a dynamically generated document.

FIG. 3 illustrates an alternative partial block diagram of a security system 300 protecting a dynamically generated document. The alternative security system 300 retrieves information from a local memory or a document storage to setup one or more documents to be signed. When generated, the document management group server 104 signs the documents with an organizational key that generates hash values before creating or rendering the documents to a user. While security system 300 services transactions to known users, it also services new business. While not limited to an insurance application or transactions that require user authentications (verifying the user) or signer authentications (identifying who signed the document), the following describes some of the transactions that may result in an insurance agreement.

To complete an insurance agreement over a public network, such as the Internet, a user may request documents that are executed by electronic signatures. When a request is received, the client application server 102 requests variable document data from a client application that may be resident to a remote computer 110. Variable document data or variable data is data that is more likely to change than constant document data or constant data, which changes less frequently and may be stored in the server cluster 114. Variable document data may include an address and/or a date that may be stored or generated by the remote computer 110. Constant document data may include product information such as information describing an insurance product or its coverage. Using client side software, the client application server 102 generates an XML-based document populated entirely or partially by variable document data. The document may also be created in other formats. When created, the document is transmitted through a firewall 112 to the data management group server 104.

At the data management group server 104, the variable data is combined or integrated with constant data that was previously stored in memory. In FIG. 3, the data management group server 104 generates the SQL requests that are used to populate a second document before returning a journal key to the client application server 102. The journal key may comprise a unique number that identifies the transaction. When the journal key is received, the data management group server 104 combines the variable data with the constant data harvested from the SQL requests. The document is then converted into a portable document. The portable document may be partially or fully formatted and may have distinctive typefaces, color, and/or graphics that can be viewed through different electronic platforms. In a new business session, the document may be an electronic fund transfer (EFT) request that is accompanied by a document memorializing a party's agreement to a new insurance policy.

Using an encryption algorithm, such as an RSA, AES, DES, triple DES, PGP or another method, the cryptography server 106 generates an organizational key that signs the documents and produces hash values, such as SHA1, for those documents. The hash values may be used to verify the integrity of the documents while the documents and hash values are temporarily staged in the SQL server 108. An audit record may also be created and temporarily archived in the SQL server 108. An audit record may correspond to a method or function that runs as part of the transaction and may include one or more of a journal key, a client indicator that identifies the client application, time stamps that identify when a method began and ended, the names of the components and classes that ran the method, an error code, error source, and error description, and if an error is found, a trace parameter.

Once the documents and files are temporarily staged in the SQL server 108, the user or agent supplied documents are streamed back through the firewall 112 and delivered to the client application, or more specifically, to the Web browser through a portal in the client application where they are signed by the user as shown in FIG. 2. Any distinctive mark, characteristic, signal, or sound that uniquely identifies a user or their agent may be used by the user or their agent to sign the documents. When a user or their agent's signature is submitted, client side software stored on the client application server 102 compares validation data to the information submitted in the signature block in real or batch time. If the user's signature is not validated, the validation process may be repeated a predetermined number of times before an error is reported.

If validated, the user and agreement documents that were previously signed with the organizational key are signed with a user key and a digital certificate is dynamically generated by the cryptography server. The digital certificate may be an electronic credential that authenticates the user or agent and may be compliant with the X.509 or another standard.

At the document management group server 104, the signature block may also be signed with the user key. The signature block may be mapped to a hash value, such as an SHA1, before the user keyed documents and the signature block hash value are temporarily staged in the SQL server 108. In some transactions, customer information that includes a customer's name and address and a second audit record structured like the audit record described above are stored in the SQL server 108.

When an insurance policy issues, the document management server 104 may store an updated index of the documents staged in the SQL server 108. It may include the signed EFT and its hash value, the agreement document and its hash value, the customer signature block and its hash value, customer information, two or more audit files, and in some instances an audit index. These SQL documents may be stored in an archive, a data warehouse, or through a middle-ware component that coherently shares and manages data and meta data on a synchronous or asynchronous program or schedule. Once stored in the data warehouse, the documents may be accessible enterprise wide.

Figure 4:
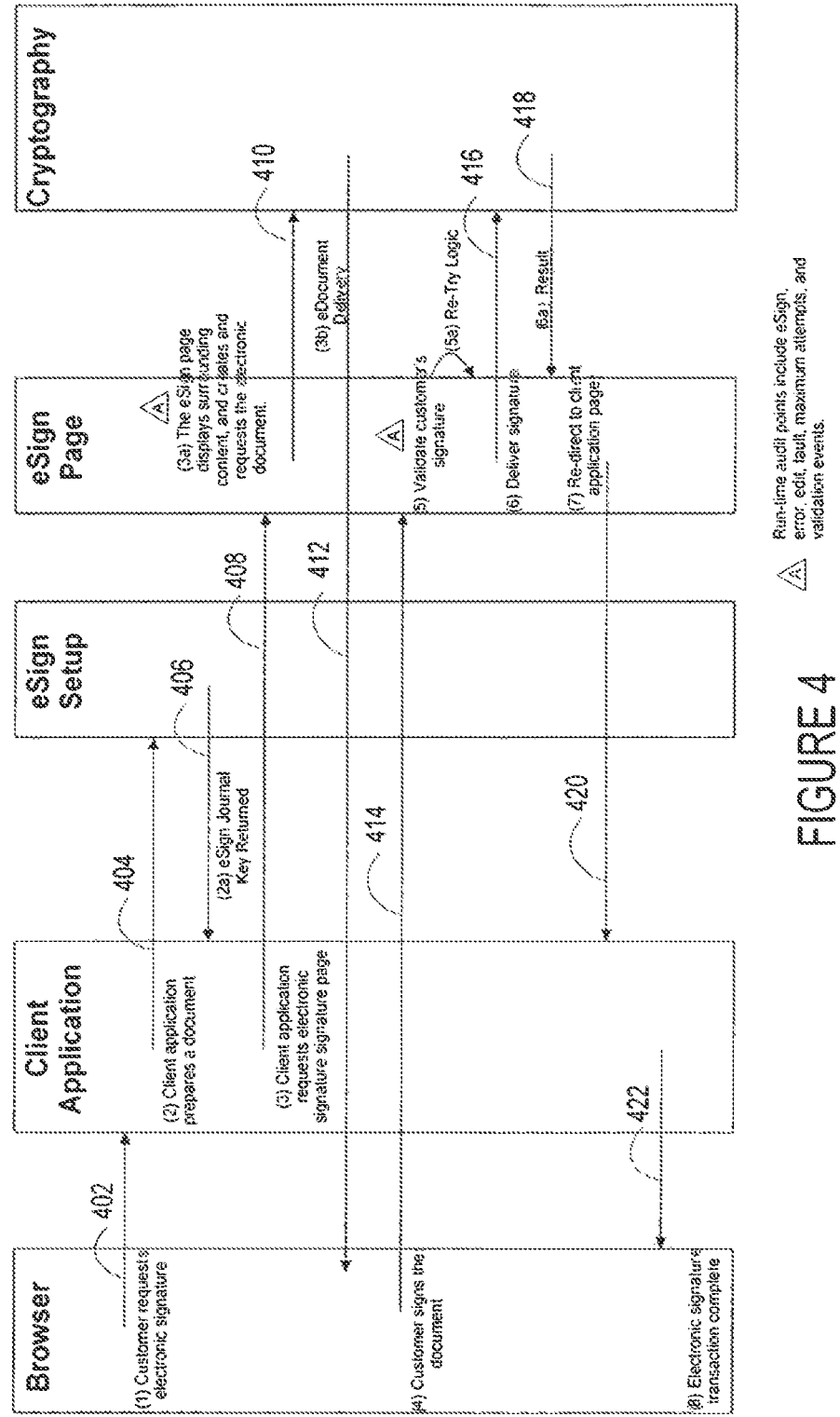
FIG. 4 is a method of authenticating the integrity of a document and the identity of a user.

FIG. 4 is a method of authenticating the integrity of a document and the identity of a user or user agent. Like the systems described above, the method may apply to any type of documents, whether the documents are pre-generated or dynamically created. The method, like the systems described above, may not authenticate or validate a user (identifying who signed the document) or capture a user's electronic signature (e-signature). In systems requiring user authentication or validation, a client application that may be remote from the security system (e.g., FIGS. 1-3) may be used to authenticate and validate a user's identity and/or capture a user's e-signature through a separate or independent authentication and/or validation system. In alternative security systems, user authentication and/or validation may be a unitary part of the security system. The authentication system may include a public key infrastructure (PKI) or another system.

The method may be used on any private (e.g., LAN, WAN, token ring, etc), public, or combined network, and is not restricted to one communication protocol. It may be used with a secure socket layer (SSL), a transport layer security (TLS), a secure hypertext transfer protocol (S-HTTP) or another protocol that that provides secure end-to-end communication. It also may be used with a network authentication protocol that authenticates the identity of a user attempting to log onto the network.

In FIG. 4, SSL provides secure end-to-end communication when a user or user agent sends a request to sign a document from a remote or local computer at act 402. The request may include information such as a name, address, product information, and/or a date. If the transaction involves proprietary or sensitive information, the transaction may be logged by persistent cookies and/or software resident to the server cluster 114, a local computer, or a remote computer that captures and monitors what the user does and what the user sees through their online session.

A client application prepares a document based on user or user agent supplied data that is then associated with a journal key at acts 404 and 406. The document may be an XML-based document. The journal key is an identifier that may comprise numbers or an alpha-numeric string that identifies the transaction.

When the client application requests an electronic signature page at act 408, information is gathered from storage and from the previously generated document, such as the XML-based document. In an insurance application, the method may gather information that is specific to an insurance policy or person and may include the primary name of the insured (PNI). In some application, the data may be combined or merged into a hypertext markup language (HTML) document.

Figure 5:
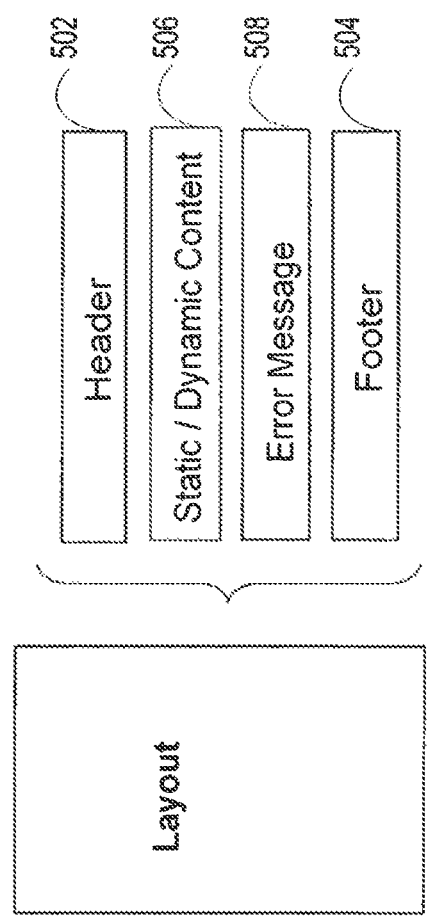
FIG. 5 is a layout of a document.

The content of the HTML document is extendable and configurable. As shown in FIG. 5, the layout of the page may include a header 502, footer 504, dynamic, static, or a combination of content 506, and an error message area. The document may be accompanied by an agreement that may be a fragment of the HTML document (e.g., within the footer) or a separate document in a commonly recognized format (e.g., HTML, PDF, etc.). The agreement document may also include a signature block that is associated with various dialog boxes and/or hyperlinks. A style sheet may also be created or retrieved from storage that controls what content will appear and how that content is shown.

When the document or documents are generated, an encryption algorithm, such as RSA, AES, DES, triple DES, PGP or another method generates an organizational key that signs the documents and produces hash values, such as SHA1s for those documents between acts 410 and 412 of FIG. 4. The hash values may be used to verify the integrity of the documents while the documents and hash values are staged in storage. An audit record may also be created and archived. The audit record may correspond to a method or function that runs as part of the transaction and may include one or more of the journal key that uniquely identifies the transaction, a client indicator that identifies the client application, time stamps that identify when a method began and ended, the names of the components and classes that ran the method, an error code, error source, an error description, and if an error is suspected or detected, a trace parameter.

Once the documents and files are stored, links to the documents such as one or more hyperlinks or the documents themselves are streamed back to the user's browser at act 412. Any distinctive mark, characteristic, signal, or sound that uniquely identifies a user or their agent may be entered by the user or their agent to sign the documents. When a user or user agent's signature is submitted at act 414, the client application compares validation data to the information submitted in a signature block in real or batch time. If the user or user agent's signature is not validated, the validation process may be repeated a predetermined number of times at act 416 before the method reports an error and re-directs the user or user agent's to another page.

When the user or user agent's signature is validated, the documents that were previously signed with the organizational key are signed with a user key and a digital certificate is retrieved or dynamically generated between acts 416 and 418. The digital certificate may be an electronic credential that authenticates the user or agent and may be compliant with the X.509 or another standard.

Between acts 416 and 418, the signature block may also be signed with the user key. The signature block may be mapped to a hash value, such as an SHA1, before the user keyed documents and the signature block hash value are stored in memory. In some transactions, customer information that may include a customer's name and address and a second audit record structured like the audit record described above may also be stored. All or some of the original documents, signed documents, hash values, audit files, and other information processed in and between acts 402-420 may be stored in an archive, a data warehouse, or through a middleware component that coherently shares and manages data and meta and that may make the documents available enterprise wide.

Once the documents are stored, the user or user agent is re-redirected to another Web page, such as a client application Web page at act 420. The transaction is complete at act 422. If an error occurs at any point in the process that a user can correct, the user may be a given a predetermined number of opportunities to correct it in real or a delayed time. If the user does not provide a complete signature, the process may describe the error before or while displaying the page. Similarly, if a signature does not match a stored signature, the page may be re-displayed with an explanation of the error. If a signing session lasts longer than a predetermined amount of time or occurs as the day of the month changes, the documents may be re-created and re-rendered in some methods. In this condition, the process may be repeated as if it were the user's first attempt to sign a document. In alternative methods, only the pending act is repeated where all the prior responses to the prior acts are maintained.

Figure 6:
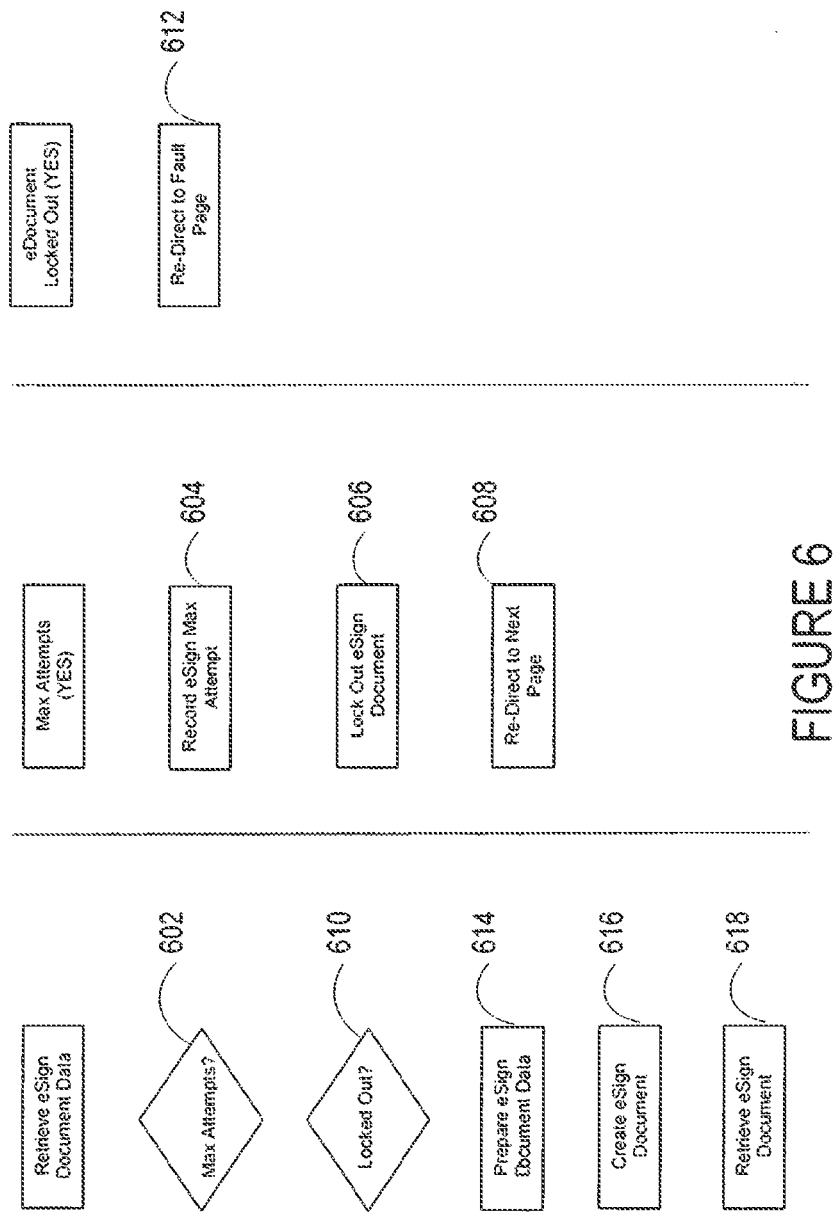
FIG. 6 is a flow diagram for retrieving and signing a document.

Any number of business rules may control the above described systems and methods. A shown in FIG. 6, the system and methods may limit the number of attempts a document is retrieved to be signed. At act 602, a server or method determines if a user has exceeded the maximum number of attempts to sign a document. If the number of attempts exceeded a predetermined number, the server or method records the maximum number of attempts at act 604, locks the documents to be generated at act 606, and re-directs the user to another page at act 608. If a user has not exceeded the maximum number of attempts to sign the document, the server or method determines if the document has been locked at act 610. If the document is locked, the user is re-directed to another page at act 612. If the document has not been locked, the server or method prepares the data and document at acts 614 and 616, before retrieving the documents at act 618.

Figure 7:
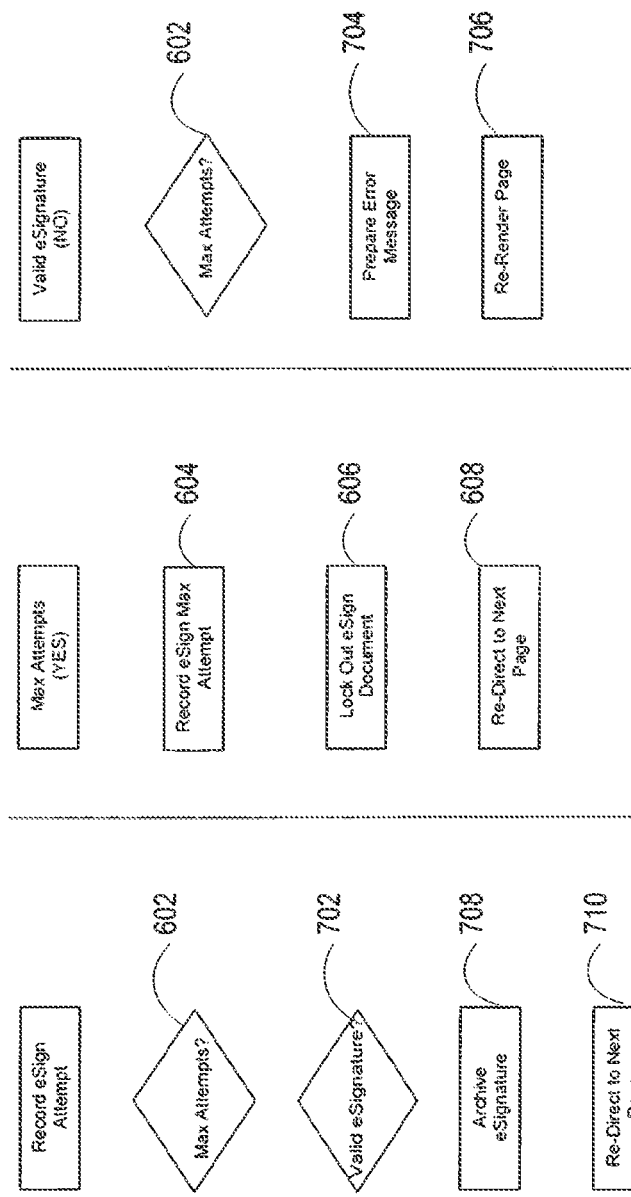
FIG. 7 is a flow diagram for controlling a user's attempt to sign a document.

Business rules may also control the number of attempts a user may try to sign a page as shown in FIG. 7. At act 602, a server or method determines if a user has exceeded the maximum number of attempts to sign a page. If the number of attempts exceeded a predetermined number, the server or method records the maximum number of attempts at act 604, locks the documents at 606, and re-directs the user to another page at act 608. If a user has not exceeded the maximum number of attempts to sign a page, the server or method determines if a valid signature has been submitted by a user or user agent at act 702.

If a signature is not valid, the server or method determines if a user has exceeded the maximum number of attempts to sign the page at act 602. If the number of attempts exceeded a predetermined number, the server or method records the maximum number of attempts at act 604, locks the documents at 606, and re-directs the user or user agent to another page at act 608. If the user has not exceeded the maximum number of attempts to sign a page, the server or method prepares and displays an error message at act 704 and re-renders the page to the user at act 706. If the signature is valid at act 702, the signature is stored at act 708 and the user or user agent is re-directed to another page at act 710.

The electronic security system is capable of authenticating a request through encryption and authorizations that localizes digital certificates and a pair of keys in a main computer or a server cluster 114. In each of the systems and methods described above, the integrity of the document or documents (document(s)) may be verified after the document(s) are signed by the organizational key. In some alternative systems and methods, anytime the document(s) are retrieved or at predetermined times, the systems and methods verify the integrity of the document(s). Upon receipt of the document(s), a recipient may process the document(s) using the same hash function used to generate the original hash value. When the two hash values are equivalent, the recipient may be assured of the integrity of the document(s). If the hash values do not match, some systems or methods may determine that the document(s) have been compromised, report an error, and repeat or lock the systems or methods. A key may comprise a sequence of data or computerized information that may be used to encrypt or decrypt other data. A product may comprise something produced by human or mechanical efforts, such as an insurance product (e.g., an insurance policy, an agreement, such as an EFT authorization, another document, etc.).

The above described system may be used or embodied with many technologies. Multiple encryption methods may be used together. In some systems, a user or user agent may receive PDF files that are signed by more than one key. Where there is concern that a PDF file may be compromised, the PDF file may itself be encrypted and digitally signed by its own key before or after it is signed by the organization key. When received, processing software may use mechanisms to track the source of the scripts and plug-in content of the PDF file and execute only those scripts or plug-in content that meets the trustworthy requirements of the sender (e.g., the organization).

In another alternative system, a user key may be stored on a key fob, smart card or within a portable hardware device that mechanically or wirelessly interfaces the user's computer. Using built in authentication, documents may be signed with the user or user agent key resident to the key fob, smart card, or hardware device once a valid signature is confirmed. Because a key fob, smart card, and hardware are physical devices, it is easy for a user to know if the device has been stolen. In comparison, a secret key known by a user or user agent may be stolen or discovered by an unauthorized user and may be used for an extended period before the theft is detected.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for processing an electronic signature, comprising:
   receiving a request at a server computer for a document that requires an electronic signature of a user at a client computer remote from the server computer;
   signing the document by the server computer with an organizational key;
   transmitting a hyperlink to the client computer that specifies the location of the document signed with the organizational key;
   receiving, at the server computer from the client computer, data that indicates that the user electronically signed the document; and
   signing the document by the server computer with a key assigned to the user of the client computer in response to the validation of the user's electronic signature;
   where neither the organizational key nor the key assigned to the user are accessible to the client computer.

2. The method of claim 1 further comprising generating the organizational key at the server computer.

3. The method of claim 1 further comprising hashing the document to render a value that verifies the integrity of the document.

4. The method of claim 1 further comprising generating a journal key that identifies the document signed by the server computer with an organizational key.

5. The method of claim 1 further comprising signing the user's electronic signature of the document with the user key.

6. The method of claim 1 further comprising archiving the signed document in response to a server initiated event.

7. The method of claim 1 further comprising archiving the signed document in response to an asynchronous event.

8. The method of claim 1 further comprising dynamically generating the document by combining variable data received from the client computer with constant data stored at the server computer.

9. The method of claim 8 where the variable data received from the client computer is combined with constant data stored at the server computer in response to receipt of a journal key at the server computer.

10. The method of claim 1 further comprising streaming the document signed with the organizational key to the client computer.

11. The method of claim 1 further comprising streaming the document signed with the organizational key to the client computer from the server computer.

12. The method of claim 1 further comprising dynamically generating the user key and a digital certificate message at a cryptography server.

13. The method of claim 1 where the validation of the of the user's electronic signature occurs at a system remote from the server computer and remote from the client computer.

14. The method of claim 13 where the validation of the user's electronic signature occurs through a public key infrastructure.

15. The method of claim 1 where the validation of the user's electronic signature occurs through a public key infrastructure.

16. The method of claim 1 where the communication between the client computer and the server computer utilizes a secure socket layer or a transport layer security.

17. The method of claim 1 further comprising signing the document with an electronic signature comprising an asymmetric key generated in a public key infrastructure process.

18. The method of claim 1 further comprising redirecting the user to a Web page.

19. A method for processing an electronic signature, comprising:
   receiving a request at a server computer for a document that requires an electronic signature of user at a client computer remote from the server computer through a uniform resource locator comprising an address for the server computer on a computer network;
   signing the document by the server computer with an organizational key;
   streaming the document signed with the organizational key to the client computer;
   receiving, at the server computer from the client computer, data that indicates that the user electronically signed the document; and
   signing the document by the server computer in response to the validation of the user's electronic signature with a key assigned to the user of the client computer;
   where neither the organizational key nor the key assigned to the user are accessible to the client computer.

20. A method for processing an electronic signature, comprising:
   receiving a request at a server computer for a document that requires an electronic signature of user at a client computer remote from the server computer;
   generating an organizational key at the server computer;
   signing the document by the server computer with the organizational key;
   streaming a hyperlink to the client computer that specifies the location of the document signed with the organizational key;
   streaming the document signed with the organizational key to the client computer;
   receiving, at the server computer from the client computer, data that indicates that the user electronically signed the document; and
   signing the document by the server computer in response to the validation of the user's electronic signature with a key assigned to the user of the client computer;
   where neither the organizational key nor the key assigned to the user are accessible to the client computer.

21. A method for processing an electronic signature, comprising:
   receiving a request at a server computer, through a uniform resource locator comprising an address for the server computer on a computer network, for a document that requires an electronic signature of user at a client computer remote from the server computer;
   generating an organizational key at the server computer;
   signing the document by the server computer with the organizational key;
   transmitting to the client computer the document signed with the organizational key;
   receiving, at the server computer from the client computer, data that indicates that the user electronically signed the document; and signing the document by the server computer in response to the validation of the user's electronic signature with a key assigned to the user of the client computer;

where neither the organizational key nor the key assigned to the user are accessible to the client computer.

* * * * *